United States Patent
Wang et al.

(10) Patent No.: US 6,377,071 B1
(45) Date of Patent: Apr. 23, 2002

(54) COMPOSITE FLAG GENERATION FOR DDR FIFOS

(75) Inventors: Bo Wang, Fremont; Pidugu L. Narayana, Sunnyvale, both of CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/540,292

(22) Filed: Mar. 31, 2000

(51) Int. Cl.[7] .............................................. H03K 19/173
(52) U.S. Cl. .............................. 326/46; 326/12; 326/96; 365/220; 365/221
(58) Field of Search ............................. 326/46, 96, 12; 365/219, 220, 221

(56) References Cited

U.S. PATENT DOCUMENTS

| | | | |
|---|---|---|---|
| 4,899,352 A | * 2/1990 | Cucchi et al. | 375/372 |
| 5,042,004 A | * 8/1991 | Agrawal et al. | 712/243 |
| 5,587,953 A | * 12/1996 | Chung | 365/220 |
| 5,627,797 A | * 5/1997 | Hawkins et al. | 365/221 |
| 5,661,751 A | * 8/1997 | Johnson | 375/219 |
| 5,712,992 A | * 1/1998 | Hawkins et al. | 395/877 |
| 5,809,339 A | * 9/1998 | Hawkins et al. | 395/877 |
| 5,844,423 A | * 12/1998 | Narayana et al. | 326/46 |
| 5,850,568 A | * 12/1998 | Hawkins et al. | 395/877 |
| 5,852,748 A | * 12/1998 | Hawkins et al. | 395/874 |
| 5,963,056 A | * 10/1999 | Narayana et al. | 326/96 |
| 6,240,031 B1 | 5/2001 | Mehrotra et al. | 365/220 |

* cited by examiner

*Primary Examiner*—Michael Tokar
*Assistant Examiner*—Steven S. Paik
(74) *Attorney, Agent, or Firm*—Christopher P. Maiorana, P.C.

(57) ABSTRACT

An apparatus comprising a first circuit, a second circuit and a third circuit. The first circuit may be configured to generate (i) one or more first enable signals and (ii) one or more first flag signals in response to a first clock signal and a second enable signal. The second circuit may be configured to generate a second flag signal in response to (i) the one or more first enable signals, (ii) the one or more first control signals, (iii) a second clock signal, and (iv) a pulse signal. The third circuit may be configured to generate the pulse signal in response to (i) a third clock signal and (ii) the one or more first flag signals.

16 Claims, 3 Drawing Sheets

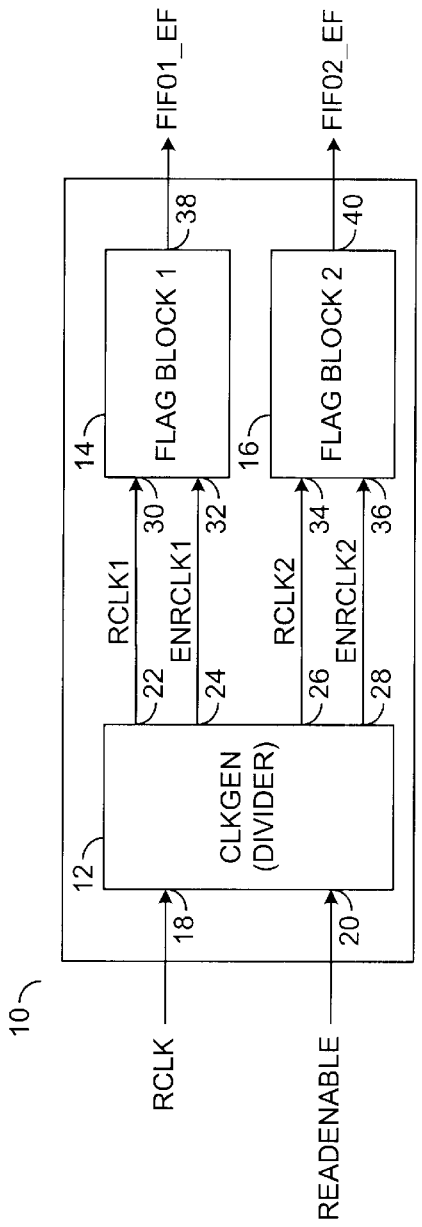
FIG. 1
(CONVENTIONAL)

COMPOSITE FLAG GENERATION FOR DDR FIFOS

CROSS REFERENCE TO RELATED APPLICATIONS

The present application may relate to U.S. Ser. No. 09/534,760, filed Mar. 24, 2000, now issued as U.S. Pat. No. 6,240,031 and Ser. No. 09/534,671, filed Mar. 24, 2000, which are hereby incorporated by reference in their entirety.

FIELD OF THE INVENTION

The present invention relates to double data rate (DDR) FIFOs generally and, more particularly, to composite flag generation method and/or architecture in DDR FIFOs.

BACKGROUND OF THE INVENTION

Performance in conventional First-in First-out (FIFO) buffers is limited by the speed of the flag logic. A DDR FIFO doubles the performance of a FIFO by internally having two FIFOs running concurrently, offset with a phase difference. A DDR FIFO requires either two slow flags or one fast flag.

Referring to FIG. 1, a circuit 10 is shown implementing such a conventional approach. The circuit 10 comprises a clock generation block 12, a flag block 14, and a flag block 16. The clock generation block 12 has an input 18 that receives a free-running read clock signal rCLK, an input 20 that receives an enable signal READENABLE, an output 22 that presents a first free-running read clock signal rCLK1, an output 24 that presents a first enabled read clock signal EnrCLK1, an output 26 that presents a second free-running clock signal rCLK2 and an output 28 that presents a second enabled read clock signal EnrCLK2. The flag block 14 has an input 30 that receives the signal rCLK1 and an input 32 that receives the signal EnrCLK1. The flag block 16 has an input 34 that receives a signal rCLK2 and an input 36 that receives the signal EnrCLK2. The flag block 14 has an output 38 that presents a first status flag signal FIFO1_EF and an output 40 that presents a second status flag signal FIFO2_EF.

The two internal slower FIFOs in a conventional DDR FIFO configuration directly present the first and second status flag signals FIFO1_EF and FIFO2_EF. The overall state of the conventional DDR FIFO is determined by two flags using some sort external glue logic. Simple external AND/OR logic will cause one cycle FIFO flag latency, which will in turn can cause misreads or miswrites at the FIFO EMPTY/FULL boundary.

SUMMARY OF THE INVENTION

The present invention concerns an apparatus comprising a first circuit, a second circuit and a third circuit. The first circuit may be configured to generate (i) one or more first enable signals and (ii) one or more first flag signals in response to a first clock signal and a second enable signal. The second circuit may be configured to generate a second flag signal in response to (i) the one or more first enable signals, (ii) the one or more first control signals, (iii) a second clock signal, and (iv) a pulse signal. The third circuit may be configured to generate the pulse signal in response to (i) a third clock signal and (ii) the one or more first flag signals.

The objects, features and advantages of the present invention include providing a method and/or architecture that may generate flags in a FIFO architecture that may (i) simplify a user interface in a DDR FIFO, (ii) allow faster FIFOs to be implemented in current FIFO architectures, (iii) eliminate the need for external flag glue logic when implementing DDR FIFOs, and/or (iv) generate a single composite empty/full flag that may operate at a DDR FIFO frequency with the same assertion latency as the conventional FIFOs.

BRIEF DESCRIPTION OF THE DRAWINGS

These and other objects, features and advantages of the present invention will be apparent from the following detailed description and the appended claims and drawings in which:

FIG. 1 is a block diagram of a conventional empty and full flag generation architecture;

DETAILED DESCRIPTION OF THE PREFERRED EMBODIMENTS

Figure 2:
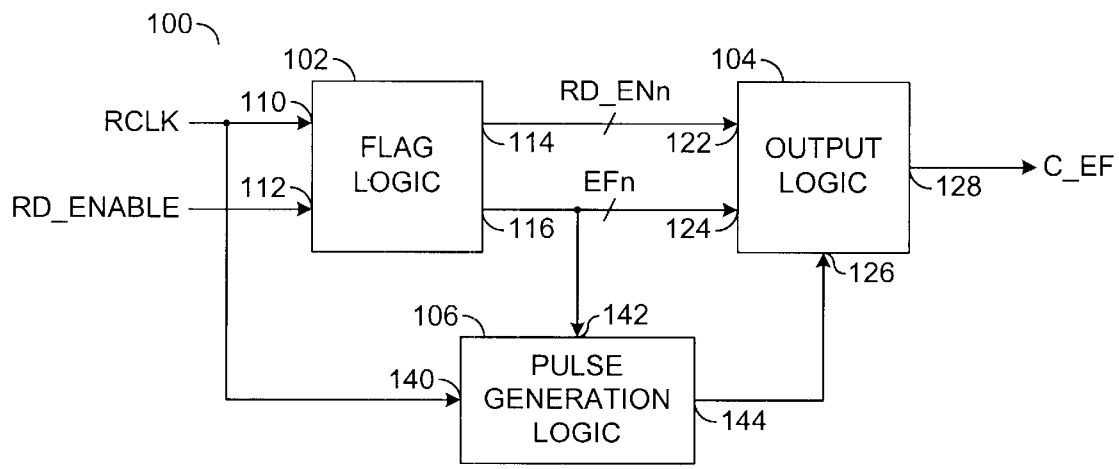
FIG. 2 is a block diagram of a preferred embodiment of the present invention.

Referring to FIG. 2, a block diagram of a circuit 100 is shown in accordance with a preferred embodiment of the present invention. The circuit 100 generally comprises a flag logic block (or circuit) 102, an output logic block (or circuit) 104, and a pulse generation logic block (or circuit) 106. The flag logic block 102 may have an input 110 that may receive a signal (e.g., RCLK), an input 112 that may receive an enable signal (e.g., RD_ENABLE), an output 114 that may present one or more enable signals (e.g., RD_ENn) and an output 116 that may present one or more flag signals (e.g., EFn). In one example, the output 114 may present a first enable signal (e.g., RD_EN1) and a second enable signal (e.g., RD_EN2). Additionally, the output 116 may present a first flag signal (e.g., EF_1) and a second flag signal (e.g., EF_2). However, the particular number of enable signals RD_ENn and the particular number of flag signals EFn may be modified accordingly to meet the design criteria of a particular implementation.

The output logic block 104 may have an input 122 that may receive the one or more signals RD_EN, an input 124 that may receive the one or more signals EF, an input 126 that may receive a signal (e.g., PULSE) and an output 128 that may present a status flag signal (e.g., C_EF). The signal C_EF may be implemented as, in one example, a composite logic flag signal. However, the signal C_EF may be implemented as other appropriate signal types in order to meet the criteria of a particular implementation. The pulse generation logic block 106 may have an input 140 that may receive the signal RCLK, an input 142 that may receive the one or more flag signals EF and an output 144 that may present the signal PULSE.

The signal RCLK may be a free running externally generated clock. The actual reading of the circuit 100 may be performed in response to the signal RD_ENABLE. In one example, the signal RD_ENABLE may be implemented as a synchronous read enable signal. However, the enable signal RD_ENABLE may be implemented as other appropriate enable signals in order to meet the criteria of a particular implementation. When the enable signal RD_ENABLE is active in a particular clock cycle, internally to the FIFO, the one or more enable signals RD_EN may be generated. A more detailed description of an example of flag generation logic that uses such signals may be found in U.S. Pat. No. 5,627,797, which is hereby incorporated by reference in its entirety.

Figure 3:
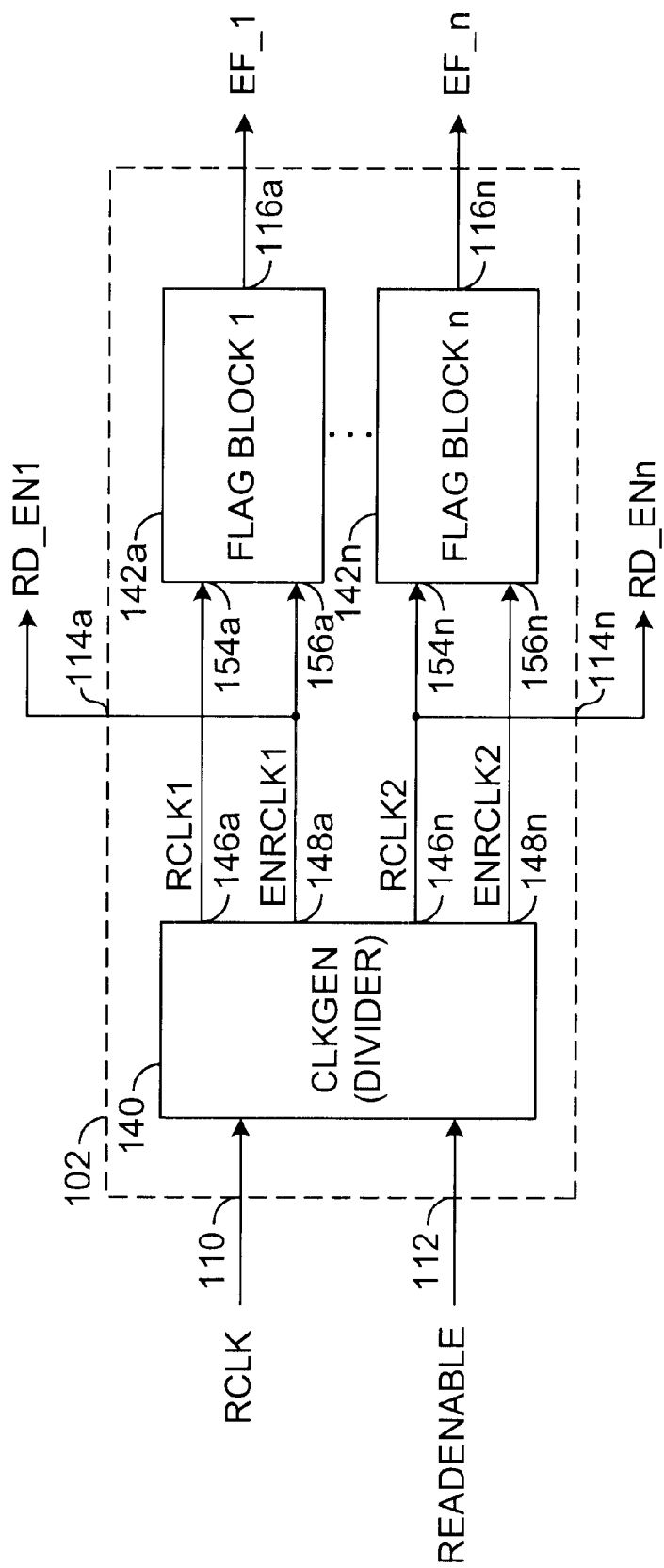
FIG. 3 is a detailed diagram of the flag logic block of FIG. 2.

Referring to FIG. 3, a more detailed diagram of the flag logic block 102 is shown. The flag logic block 102 generally comprises a clock generation block 140, and a number of flag blocks 142a–142n, where n is an integer. The clock generation block 140 may have an input 110 that may receive the free-running read clock signal rCLK, an input 112 that may receive a read enable signal RD_ENABLE, an output 146a that may present a first free-running read clock signal (e.g., rCLK1), an output 148a that may present a first enabled read clock signal (e.g., RD_EN1), an output 146n that may present a second free-running clock signal (e.g., rCLKn) and an output 148n that may present a second enabled read clock signal (e.g., RD_ENn). The flag block 142a has an input 154a that may receive the signal rCLK1 and an input 156a that may receive the signal RD_ENa. The flag block 142n may have an input 154n that may receive the signal rCLKn and an input 156n that may receive the signal RD_ENn. The flag block 142a have an output 116a that may present a first status flag signal (e.g., EF_1). The flag block 142n may have an output 116n that may present a second status flag signal (e.g., EF_2). The signals RD_EN1 and RD_En may also be presented to an output 114a and 114n, respectively.

Figure 4:
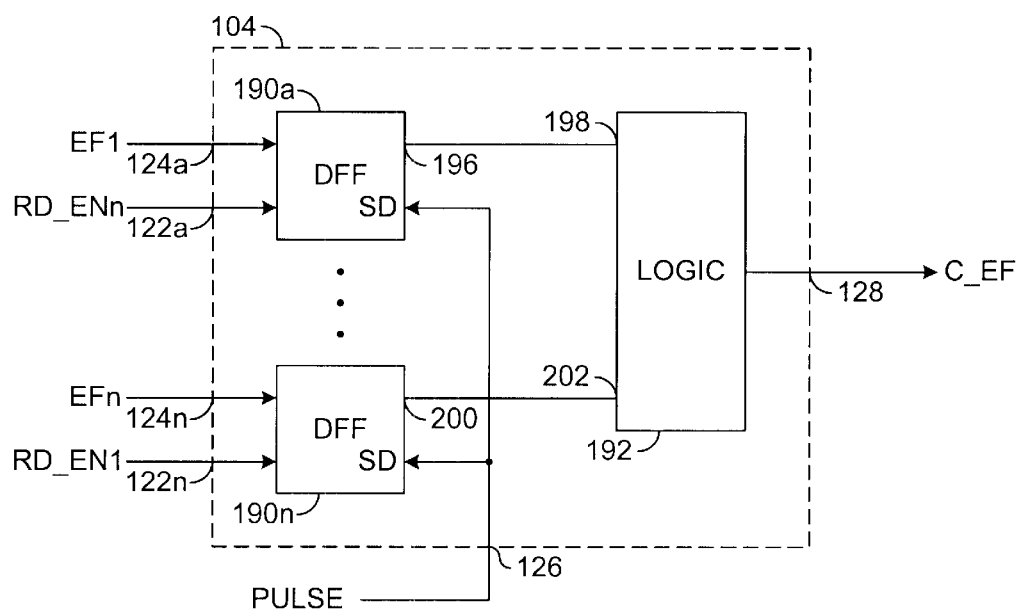
FIG. 4 is a detailed diagram of the output logic block of FIG. 2.

Referring to FIG. 4, a more detailed diagram of the output logic block 104 is shown. The output logic block 104 generally comprises a number of flip-flops 190a–190n, where n is an integer, and a logic block 192. Each of the flip-flops 190a–190n may be implemented, in one example, as D-type flip-flops. However, other flip-flops may be implemented accordingly to meet the design criteria of a particular implementation. While the circuit 100 has been described generally in the context of two FIFOs, a greater number of FIFOs may be implemented accordingly to meet the design criteria of a particular implementation. With a greater number of FIFOS, the number of flip-flops 190a–190n, the number of inputs 122a–122n and the number of inputs 124a–124n, would also be increased accordingly.

The flip-flop 190a may have a first input that may receive a signal (e.g., EF_1), a second input that may receive a signal (e.g., RD_ENn) and a set input that may receive the signal PULSE. The flip-flop 190a may have an output 196 that may present a signal to an input 198 of the logic block 192. Similarly, the flip-flop 190n may have a similar configuration and may have an output 200 that may present a signal to an input 202 of the logic block 192. The logic block 192 may combine the signals received at the inputs 198 and 202 to present the signal C_EF. The logic block 192 may be implemented, in one example, as a wired AND gate (or register output) for faster flag generation. However, other logic gates may be implemented accordingly to meet the design criteria of the particular implementation. By using, in one example, the signal RD_EN1 to clock the signal EF_2, a lengthy calculation of the signal EF_2 may be eliminated.

Figure 5:
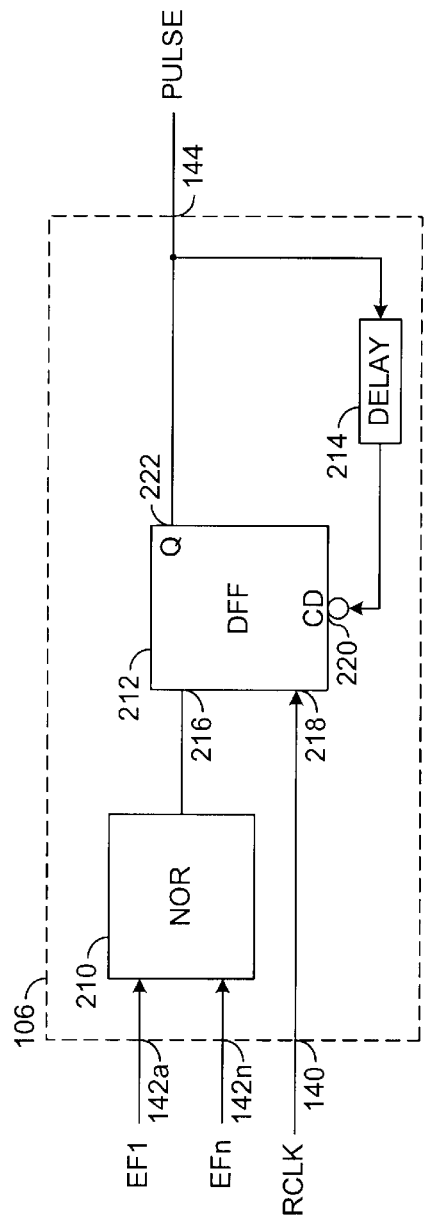
FIG. 5 is a detailed diagram of the pulse generation logic block of FIG. 2.

Referring to FIG. 5, a more detailed diagram of the pulse generation logic block 106 is shown. The pulse generation logic block 106 may be used to deassert the composite flag C_EF. The pulse generation logic block 106 may have a number of inputs 142a–142n that may receive a number of signals EF1–EFn and an input 140 that may receive the signal RCLK. The pulse generation logic block 106 may comprise a gate 210, a flip-flop 212 and a delay block 214. The gate 210 may have a first input that may receive the signal EF1 and a second input signal that may receive the signal EFn. The flip-flop 212 may have an input 216 that may receive a signal from the gate 210, an input 218 that may receive the signal RCLK, an input 220 that may receive a clock signal, and an output 222 that may present the signal PULSE. The delay block 214 may present the signal to the input 220 in response to the signal PULSE. The delay block 214 may be implemented as a self-timed output slave register clock to make the output switching independent of clock skew.

The various signals are generally "OFF" (e.g., a digital HIGH, or 1) or "ON" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The signal C_EF may be a composite Empty/Full flag that may be used in a DDR FIFO configuration that may operate at double the speed of conventional FIFO status flags. The circuit 100 may simplify the implementation of a DDR FIFO user interface by providing only one flag pin for each flag and by hiding internal DDR FIFO operations. The circuit 100 may eliminate the need for external flag glue logic for the implementation of DDR FIFOs. The circuit 100 may use a flag lookahead circuit to eliminate one cycle flag assertion latency associated with the original DDR FIFO architecture. An example of a flag look-ahead architecture may be found in U.S. Pat. Nos. 5,712,992; 5,809,339; 5,627,797; 5,850,568 and 5,852,748, which are each hereby incorporated by reference in their entirety.

The circuit 100 may use the clock signal RCLK1 and the enable signal RD_EN1 from a first FIFO to clock the register 142 of the second FIFO and clock signal RCLK2 and the enable signal RD_EN2 of the second FIFO to clock the register 142 of the first FIFO. Such an implementation may simplify the user interface to the DDR FIFO. In one example, the user interface from current FIFOs may be used without modification. Using the same user interface may enable a vendor to back fill a current portfolio with FIFOs made with the circuit 100. The circuit 100 may eliminate the need for external flag glue logic when implementing DDR FIFOs. The single composite Empty/Full flag C_EF may operate at the DDR frequency with the same assertion latency as the current FIFOs.

Since the signal RD_ENn may be used to clock the empty flag register 190a of the first FIFO and the signal RD_EN1 may be used to clock the empty flag register 190n. The composite flag generation does not generally have to wait for the lengthy calculation of the flag EF of the first FIFO to finish. Additionally, the circuit 100 may be extended to generate an almost full/almost empty signal (e.g., AF/AE) in DDR FIFOs. Such an implementation may enable future FIFO speed improvements.

The circuit 100 may generate fast composite flags from 2 or more slower flags. The circuit 100 may be used for both boundary and intermediate flag generation. The flag lookahead architecture of the circuit 100 may be used in future quad data rate (QDR) and 8-DR FIFOs where 4 or 8 FIFOs are running internally.

The circuit 100 may be extendable to N phases (where N is an integer), etc. (e.g., N=3 or +). The circuit 100 may be extendable to an N phase internal PLL when using the enabled read clocks RD_EN1-RD_ENn.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to generate (i) one or more first enable signals and (ii) one or more first flag signals in response to a first clock signal and a second enable signal;
   a second circuit configured to generate a composite flag signal in response to (i) said one or more first enable signals, (ii) said one or more first flag signals, and (iii) a pulse signal; and
   a third circuit configured to generate said pulse signal in response to (i) said first clock signal and (ii) said one or more first flag signals, wherein said apparatus comprises a flag generation architecture that uses a first of said one or more first enable signals to clock a register of a second FIFO and a second of said one or more first enable signals to clock a register of a first FIFO.

2. The apparatus according to claim 1, wherein said apparatus reduces latency when generating said composite flag.

3. The apparatus according to claim 1, wherein said first circuit comprises a flag logic circuit.

4. The apparatus according to claim 1, wherein said second circuit comprises an output logic circuit.

5. The apparatus according to claim 1, wherein said third circuit comprises a pulse generation logic circuit.

6. The apparatus according to claim 1, wherein said composite flag signal is generated faster than the generation of the one or more first flag signals.

7. The apparatus according to claim 1, wherein said composite flag signal comprises an almost empty/almost full flag.

8. The apparatus according to claim 1, wherein said composite flag signal comprises an empty flag.

9. The apparatus according to claim 1, wherein said composite flag signal comprises a full flag.

10. The apparatus according to claim 1, wherein said second circuit further comprises a wired AND register configured to generate said composite flag signal.

11. The apparatus according to claim 1, wherein said third circuit comprises:
    a self-timed output slave register clock configured to control an output switching of the composite flag signal independently of clock skew.

12. The apparatus according to claim 1, wherein said apparatus further comprises:
    a plurality of memory devices, each configured to generate at least one of said one or more first enable signals and at least one of said one or more first flag signals.

13. The apparatus according to claim 1, wherein said apparatus comprises a flag lookahead architecture.

14. An apparatus comprising:
    means for generating (i) one or more first enable signals and (ii) one or more first flag signals in response to a first clock signal and a second enable signal;
    means for generating a second flag signal in response to (i) said one or more first enable signals, (ii) said one or more first flag signals, and (iii) a pulse signal; and
    means for generating said pulse signal in response to (i) said first clock signal and (ii) said one or more first flag signals, wherein said apparatus comprises a flag generation architecture that uses a first of said one or more first enable signals to clock a register of a second FIFO and a second of said one or more first enable signals to clock a register of a first FIFO.

15. A method for generating a composite flag signal from one or more second flag signals comprising the steps of:
    (A) generating (i) one or more first enable signals and (ii) said one or more second flag signals in response to a first clock signal and a second enable signal;
    (B) generating said composite flag signal in response to (i) said one or more first enable signals, (ii) said one or more second flag signals, and (iii) a pulse signal; and
    (C) generating said pulse signal in response to (i) said first clock signal and (ii) one or more first flag signals, wherein step (B) further comprises clocking a register of a second FIFO with a first of said one or more first enable signals and clocking a register of a first FIFO with a second of said one or more first enable signals.

16. The method according to claim 15, wherein said method reduces latency when generating said composite flag.

* * * * *